Aug. 5, 1969  L. K. KUNZ  3,459,196
SMOKING PIPE

Filed Sept. 29, 1967  2 Sheets-Sheet 1

INVENTOR.
LUDWIG K. KUNZ
BY
Townsend and Townsend
ATTORNEYS

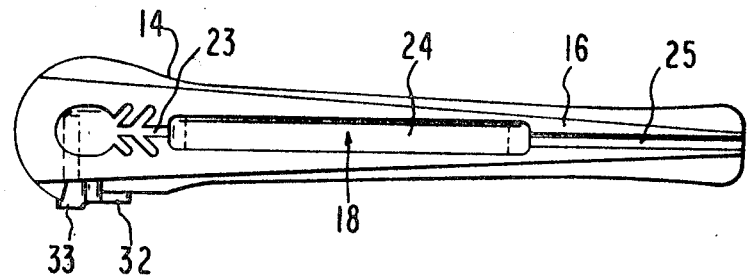
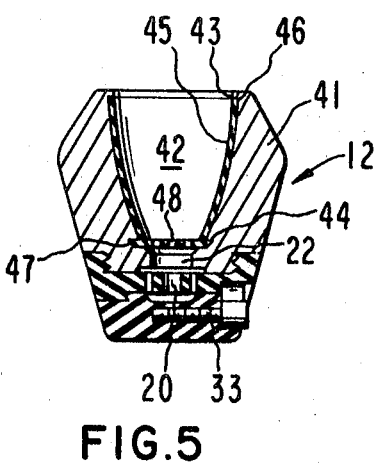
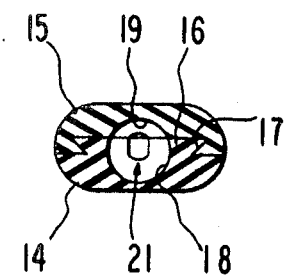

United States Patent Office 3,459,196
Patented Aug. 5, 1969

3,459,196
SMOKING PIPE
Ludwig K. Kunz, 1407 Bellingham Way,
Sunnyvale, Calif. 94087
Filed Sept. 29, 1967, Ser. No. 671,661
Int. Cl. A24f 1/02, 1/20, 1/18
U.S. Cl. 131—199  7 Claims

ABSTRACT OF THE DISCLOSURE

A smoking pipe is disclosed with a separable stem including a locking assembly with a lever arm mounted on one stem member movable between two positions and a portion projecting therefrom engaging a recess in the other stem member with the recess aligned substantially perpendicular to the line of separtion between the two members. A pipe bowl liner is provided which is snapped into position in the bowl and retained therein and also which provides a screen for the bottom of the bowl.

---

The present invention relates in general to smoking pipes and more particularly to a pipe which can be disassembled for cleaning.

Broadly stated, the present invention is directed to a smoking pipe provided with a separable stem having upper and lower members slidably interfitting with a dove-tail tongue and groove tapered linearly from one end of the stem to the other and with a locking and unlocking assembly on one of the members for providing locking engagement between the members during sliding engagement of the dove-tail tongue and groove.

The construction in accordance with the present invention provides a pipe which can easily be disassembled and reassembled for cleaning matter such as tars that typically collect in a pipe stem. Disassemblable pipes have been provided in the past, but the device for locking and unlocking the disassemblable members has either been difficult to operate or failed to produce a tight fit between the disassemblable members.

In accordance with the present invention, a locking assembly is provided which permits a tight locking of the disassemblable stem members and at the same time easy disassembly thereof. This construction includes a lever arm rotatably mounted on one member and provided with an engaging projection that engages a recess in the other member. With this construction, a positive locking and unlocking assembly is provided.

Another aspect of the present invention is the provision of a rotatable mount for the lever arm on the lower of the two stem members and recesses for retaining the lever arm in locked position parallel to the length of the stem and in unlocked position at an angle to the length of the stem. With this construction, the stem members can be simply unlocked by pressing down on the lever arm to actuate the engaging projection in a recess in the upper of the two members. The lower stem recesses retain the lever arm in locked or unlocked position preventing accidental disassembly during use and preventing the lever arm from falling into a position during reassembly that would prevent the engaging projection from sliding into locking position.

In accordance with another aspect of the present invention, the recess for receiving the engaging projection of the lever arm extends into the stem members in a direction substantially normal to the line of separation of the two members. With this construction when the projecting portion is engaged in the recess and the lever operated to apply locking or unlocking force, this force is directed substantially longitudinally of the stem members to best operate the sliding dove-tail tongue and groove thereby avoiding forces directed transverse to sliding direction of the joint that would tend to break the engaging edges of the joint.

In accordance with another aspect of the present invention, the smoke passage defined by the two separable members of the stem includes a plurality of trapping chambers extending angularly from the smoke passage for collection of undesired tars in the smoke drawn through the pipe.

In accordance with still another aspect of the present invention, the bowl of the pipe, which can be replaceable, includes a snap-in insert of a durable material such as, for example, Teflon which not only serves as a pipe liner but also as a screen for preventing undesired contamination of the smoke passage into the interior of the pipe.

Other objects, features and advantages of the present invention will become apparent upon reading the following specification and referring to the accompanying drawings in which similar characteristics of reference represent corresponding parts in each of the several views.

In the drawing:

FIG. 4 is a top view of the disassembled pipe stem looking at the lower stem member as taken along line 4—4 in FIG. 2;

FIG. 5 is an elevational cross-sectional view taken through the bowl of the pipe in FIG. 1 along line 5—5; and FIG. 6 is an elevational cross-sectional view of the stem portion of the pipe shown in FIG. 1 taken along line 6—6 in the direction of the arrows.

Figure 1:
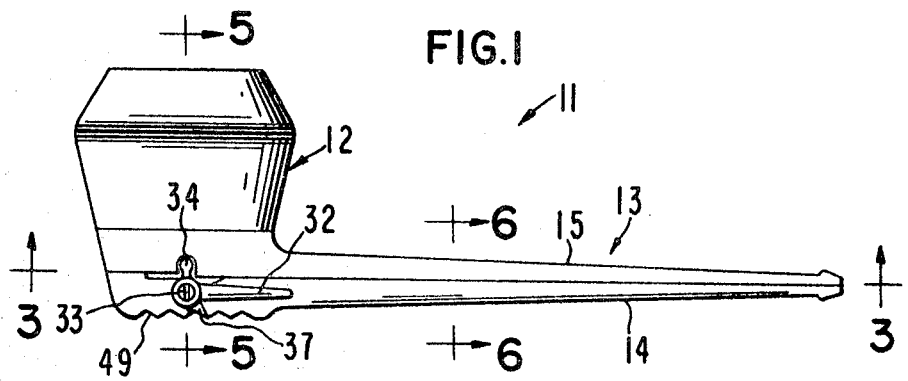
FIG. 1 is a side elevational view of a smoking pipe constructed in accordance with the present invention in assembled and locked position.

Referring now to the drawing with particular reference to FIG. 1, there is shown a smoking pipe 11 in accordance with the present invention including a tobacco bowl 12 and a stem 13. The stem 13 is made up of disassemblable lower and upper members or stem halves 14 and 15 respectively which in turn respectively include mating dove-tail tongue and groove 16 and 17 which are tapered linearly from the bowl to the bite end of the pipe stem 13. The lower and upper members 14 and 15 are also provided with longitudinally extending recesses 18 and 19, respectively, in the mating surfaces thereof for defining a smoke passage 21 extending from the bowl end of the pipe to the bite end thereof. The bowl end of passage 21 communicates with the bowl via apertures 20 in the bowl socket of the upper member 15 and a bowl aperture 22.

The dimensions of the recesses 18 and 19 are varied simultaneously along the length thereof so that the smoke passage 21 includes a first narrow smoke passage portion 23 adjacent to the bowl, then an enlarged passage portion 24 for receiving a filter, and then a narrow smoke passage portion 25 extending to the bite. The recesses 18 and 19 also include mating angulared extensions from the smoke passage portion 23 to define tar trapping chambers 26 leading off of the main smoke passage.

A locking and unlocking assembly 31 is provided for the pipe 11 and incldues a lever arm 32 rotatably mounted via a pin 33 on the lower stem member 14 adjacent the bowl end thereof. An engaging projection 34 extends from the lever arm substantially perpendicular thereto at the rotatable mount on pin 33. The upper stem member 15 is provided with a recess 35 adjacent the bowl end thereof and directed substantially perpendicular to the line of separation of the upper and lower stem members 14 and 15 for receiving the engaging projection 34 of the lever arm 32. In order to maintain the lever arm 32 in locked and unlocked positions the lower stem member 14 is provided respectively with a lever holding recess 36 extending longitudinally thereof toward the bite from the location of pin 33 and a second lever holding recess 37 arranged at an angle with respect to the length of the stem member 14.

The bowl 12 of the pipe includes a hollow, cup shaped, outside wall 41 defining the central pipe cavity 42 with a radially inwardly extending shoulder 43 at the upper open edge of the bowl and a radially outwardly extending groove 34 in the bottom of the cavity 42 for receiving and retaining a bowl liner 45. The bowl liner 45 is formed as a thin walled cupped shaped member the top 46 of which is dimensioned to be received and retain below the wall shoulder 43, and the liner 45 is provided with a radially outwardly extending lip 47 at the bottom thereof for projection into the wall groove 44. A plurality of apertures 48 are provided in the bottom of the liner 45 to permit smoke passage therethrough and to serve as a screen to prevent ash and tobacco from carrying into the stem of the pipe.

The liner 45 is resilient and the periphery of the lip 47 is bevelled to facilitate sliding thereof on in FIG. 5, to snap into the groove 44, the top portion 46 of the liner becoming engaged under the shoulder 43, as shown, at the same time.

Lower stem member 14 can be provided with a plurality of serrations 49 extending thereacross to aid in the movement of the lower stem member 14 with respect to the upper stem member 15.

Figure 2:
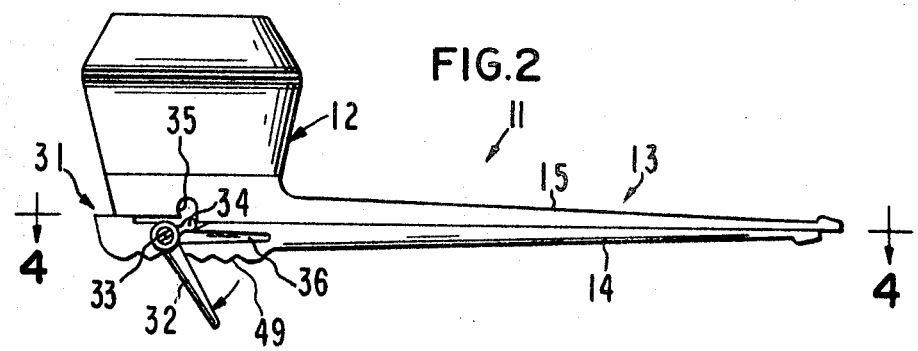
FIG. 2 is a view similar to FIG. 1 with the separable members of the pipe stem in unlocked position.
Figure 3:
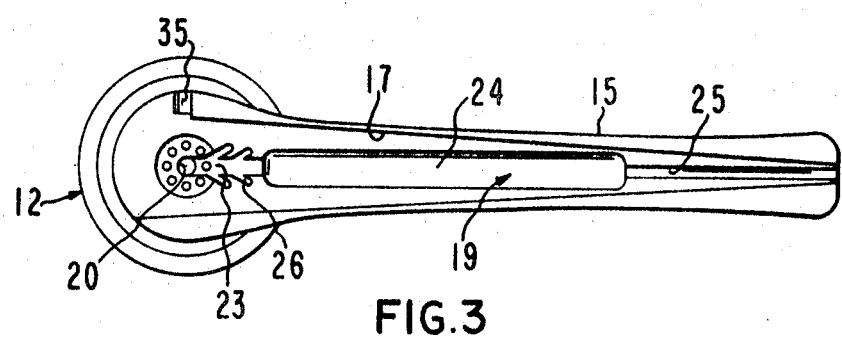
FIG. 3 is a bottom view of the disassembled pipe stem looking at the upper stem member as along line 3—3 in FIG. 1.

The pipe can be disassembled by pressing down on lever 32 in its locked position shown in FIG. 1. Since the recess 35 extends substantially normal to the line of separation of the upper and lower stem members 14 and 15, the force produced by the engaging projection 34 on the walls of recess 35 is directed substantially longitudinally of the stem 13 causing the lower stem member 14 to move longitudinally with respect to the upper stem member 15 along the dove-tail joint for movement to the unlocked position shown in FIG. 2 and separation of the stem members 14 and 15. With this construction, little force is directed transversely of the length of the dove-tail joint which would tend to break the engaging edges of the joint.

With the stem members 14 and 15 separated the smoke passage 21 can be cleaned and any filter being used replaced. The stem members can then be slidably re-engaged. During sliding re-engagement by reason of a partially enlarged opening into the recess 35 from the end of the pipe the engaging projection 34 located in unlocked position rides clear at the upper stem member 15 until it reaches the edge of the recess 35 closest the bite and causes the lever arm 32 to move toward locked position. Final tight engagement between the stem members 14 and 15 is accomplished by then moving the lever arm 32 to its locked position.

Since the holes 48 in liner 45 serve as a screen, the number of small holes 20 can be opened up into a large hole if secondary screening is not needed.

Although the foregoing invention has been described in some detail by way of illustration and example for purposes of clarity and understanding, it is understood that certain modifications can be practiced within the spirit of the invention as disclosed herein.

What is claimed is:

1. A smoking pipe comprising:
a vertical bowl and
a stem connected to said bowl, said stem including an upper member and a lower member, said upper and lower members together defining a smoke passage extending longitudinally of the stem from the base of the bowl at one end of said stem to the other end of said stem,
said upper and lower members defining a mating dove-tail tongue and groove tapered linearly from one end of said stem to said other end whereby said membes are slidable relative to each other, a locking and unlocking means mounted on one of said members for providing locking engagement between said members during slidable engagement of said dove-tail tongue and groove wherein said locking and unlocking means includes an elongate lever arm and an engaging projection thereon, means for rotatably mounting said lever arm on said lower member, said upper member having a recess projecting substantially perpendicular to the line of separation of said upper and lower members for receiving said engaging projection when said upper and lower members are slidably joined together with the projection positioned substantially perpendicular to the line of separation between said upper and lower members whereby locking and unlocking force applied between said members during closing and opening thereof is directed substantially longitudinally of said members.

2. The smoking pipe in accordance with claim 1 wherein the axes of said lever arm and said extending projection are arranged substantially perpendicular to one another whereby said lever arm extends longitudinally of said stem in locking position, said lower member having a longitudinally extending recess adjacent the locking position of said lever arm for retaining said lever arm in locking position and a second recess positioned at an angle with respect to said first recess for holding said lever arm in unlocked position.

3. The smoking pipe in accordance with claim 1 including a plurality of trapping chambers defined by said upper and lower members and extending angularly from said smoke passage.

4. The smoking pipe in accordance with claim 1 including an insert liner for said bowl and cooperating means on said insert and bowl for locking said insert in place within said bowl.

5. The smoking pipe in accordance with claim 1 wherein said bowl includes a central cavity communicating at the base of said bowl with said stem smoke passage, a substantially radially inwardly extending shoulder at the mouth of said bowl and a substantially radially outwardly extending groove near the base thereof, and a liner insert for said bowl slidably insertable within said bowl under said shoulder and having a projection cooperating with said groove for retention of said insert within said bowl.

6. A smoking pipe comprising: a bowl; a stem connected to said bowl, said stem including an upper member and a lower member, said upper and lower members together defining a smoke passage extending longitudinally of the stem from the base of the bowl at one end of said stem to the other end of said stem; said upper and lower members defining a mating dove-tail tongue and groove tapered linearly from one end of said stem to said other end; and a locking and unlocking assembly including a lever arm, means for rotatably mounting said lever arm on said lower member adjacent the bowl end thereof, and an engaging projection intermediate the ends thereof on said lever arm extending substantially perpendicular thereto at the location of said mounting means; said upper member having a recess at the bowl end thereof for receiving said engaging projection when said upper and lower members are slidably bound together, said recess extending substantially perpendicular to the line of separation of said upper and lower members.

7. The smoking pipe in accordance with claim 6, where-recess positioned at an angle with respect to said first recess for retaining said lever arm in unlocked position. in said lower member includes a longitudinally extending recess adjacent the locking position of said lever arm for retaining said lever arm in locking position and a second

References Cited

UNITED STATES PATENTS

| 34,187 | 1/1862 | Andrews | 131—220 X |
| 923,419 | 6/1909 | Drake et al. | 131—199 |
| 1,669,353 | 5/1928 | Sorbello | 131—199 |
| 1,725,366 | 8/1929 | Monette | 131—192 |
| 1,767,997 | 6/1930 | Nicholls | 131—220 X |
| 2,467,002 | 4/1949 | Atkins | 131—199 X |

FOREIGN PATENTS 668,488  7/1929  France.

JOSEPH S. REICH, Primary Examiner

U.S. Cl. X.R.

131—220